(12) United States Patent
Schlitzkus et al.

(10) Patent No.: US 8,104,357 B2
(45) Date of Patent: Jan. 31, 2012

(54) CONNECTION UNIT FOR A PRESSURE MEASURING CELL

(75) Inventors: Michael Schlitzkus, Dietmannsried (DE); Stefan Kopf, Pfalzgrafenweiler (DE); Hartmut Rohde, Waltenhofen (DE); Harry Kaiser, Markgroeningen (DE); Peter Muehlbeyer, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 12/596,522

(22) PCT Filed: Jul. 2, 2008

(86) PCT No.: PCT/EP2008/058505
§ 371 (c)(1),
(2), (4) Date: Oct. 19, 2009

(87) PCT Pub. No.: WO2009/007286
PCT Pub. Date: Jan. 15, 2009

(65) Prior Publication Data
US 2010/0192696 A1 Aug. 5, 2010

(30) Foreign Application Priority Data
Jul. 10, 2007 (DE) .......................... 10 2007 031 980

(51) Int. Cl.
*G01L 7/00* (2006.01)
(52) U.S. Cl. ........................................... 73/756; 73/714
(58) Field of Classification Search ........................ None
See application file for complete search history.

(56) References Cited

U.S. PATENT DOCUMENTS
6,086,043 A  7/2000  Hoffelder
(Continued)

FOREIGN PATENT DOCUMENTS
DE  196 40 261  4/1998
(Continued)

OTHER PUBLICATIONS
M Eisenbarth, et al: "Pressfit Technology ..." Semicon Weste 2002, IEEE 2002 (In English).
(Continued)

*Primary Examiner* — Andre Allen
(74) *Attorney, Agent, or Firm* — Michael J. Striker (57) ABSTRACT

The invention proposes a connection unit for a pressure measuring cell, comprising at least one pressure measuring cell (40) which detects, in particular, a pressure of a hydraulic block, wherein the pressure measuring cell (40) has at least one connection point (18) via which at least one electrical output signal from the pressure measuring cell (14) can be tapped off, having at least one circuit mount (20) on which at least one electronic component (26) and/or a printed circuit board (32) with an electronic component (26) can be arranged, wherein the circuit mount (20) has at least one external conductor track (47), for the purpose of establishing contact between the connection point (14) and the electronic component (26), wherein at least one contact means (51) is provided, via which an output signal from the electronic component (26) can be tapped off, wherein the electronic component (26) is connected to the contact means (51) via at least one external conductor track (47) of the circuit mount (20).

10 Claims, 7 Drawing Sheets

U.S. PATENT DOCUMENTS

| | | |
|---|---|---|
| 6,651,509 B2 | 11/2003 | Scholz et al. |
| 6,799,812 B2 | 10/2004 | Risch et al. |
| 6,935,182 B2 | 8/2005 | Imai et al. |
| 7,497,722 B2 | 3/2009 | Henn et al. |
| 2003/0024321 A1* | 2/2003 | Burczyk et al. ............ 73/756 |
| 2007/0069354 A1 | 3/2007 | Dangelmaier et al. |
| 2009/0293627 A1* | 12/2009 | Tham et al. ............ 73/721 |

FOREIGN PATENT DOCUMENTS

| | | |
|---|---|---|
| DE | 201 11 343 | 10/2001 |
| DE | 10122330 | 2/2002 |
| DE | 102 44 760 | 10/2003 |
| DE | 103 26 389 | 1/2004 |
| DE | 103 54 189 | 11/2004 |
| DE | 20 2005 011 253 | 10/2005 |
| DE | 10 2004 032 984 | 1/2006 |
| DE | 10 2004 033 846 | 2/2006 |
| DE | 10 2005 046 008 | 3/2007 |
| DE | 20 2005 017 626 | 1/2008 |
| JP | 9-288004 | 11/1997 |
| JP | 10-62282 | 3/1998 |
| JP | 10-62284 | 3/1998 |
| JP | 10-98059 | 4/1998 |
| JP | 11-211599 | 8/1999 |
| JP | 2000199721 | 7/2000 |
| JP | 2001-68692 | 3/2001 |
| JP | 2003-130742 | 5/2003 |
| JP | 2003-532584 | 11/2003 |
| JP | 2004-20216 | 1/2004 |
| WO | 01/85511 | 11/2001 |
| WO | 03/064230 | 8/2003 |
| WO | 2008/122457 | 10/2008 |
| WO | 2008/122464 | 10/2008 |
| WO | 2008/122465 | 10/2008 |

OTHER PUBLICATIONS

D. Moser et al: "3D-MID-Multifunctional Packages . . . " Jul. 31, 2006, Springer, Berlin, Heidelberg (In English).

* cited by examiner

CONNECTION UNIT FOR A PRESSURE MEASURING CELL

CROSS-REFERENCE TO A RELATED APPLICATION

The invention described and claimed hereinbelow is also described in German Patent Application DE 10 2007 031 980.2 filed on Jul. 10, 2007. This German Patent Application, whose subject matter is incorporated here by reference, provide the basis for a claim of priority of invention under 35 U.S.C. 119(a)-(d).

BACKGROUND OF THE INVENTION

The present invention is directed to a connection unit for a pressure measuring cell according to the general class of the independent claim. Publication DE 10 2004 033 846 A1 makes known a valve comprising an integrated pressure sensor. A pressure sensor is integrated in a valve for controlling fluids, e.g., for brake systems of a motor vehicle, in order to measure the pressure of the fluid that is controlled by the valve. The pressure of the hydraulic fluid is transferred to the measuring diaphragm of the measuring cell via a bore hole in the pole core of the valve dome. Several through-bores are formed in a printed circuit board, through which the electrical contacts of the pressure sensor and/or the electrical part of the valve are guided.

A braking device comprising an integrated pressure sensor module is made known in DE 101 22 330 A1. It includes an assembled control device, in the case of which a first pluggable housing unit—which mainly encloses the electronic components on one or more component carriers—is plugged together via a block-shaped solid part to a first surface of the solid part in order to establish a magnetic and electrical connection, the solid part including magnetically actuated hydraulic valves for controlling brakes and hydraulic lines. Pressure sensors which are integrated in the assembled control device are provided for measuring the pressure in the hydraulic lines at suitable measuring points.

SUMMARY OF THE INVENTION

The object of the present invention is to provide a connection unit (4), a pressure measuring cell, which facilitates miniaturization while retaining the use of conventional production methods.

The connection unit, according to the present invention, for a pressure measuring cell having the features of the independent claim has the advantage that it is particularly compact in design. The assembly is therefore mechanically very robust, which has positive consequences in particular in terms of replacing a built-on unit that is connected to the pressure measuring cell. Furthermore, the assembly results in a separable connection between the pressure measuring cell and the built-on unit. The compact design of the connection unit for the pressure measuring cell may also reduce manufacturing costs.

In an advantageous further development, the contacting between the pressure measuring cell and the circuit carrier, and/or between the circuit carrier and the printed circuit board/electronic components is established via conductive adhesive points. In particular, the design of the contacting using conductive adhesive domes ensures that the conductive adhesive contacting is secure even under fluctuating operating temperatures.

In an advantageous further development, the circuit carrier includes an opening above the pressure measuring cells, into which a sealing means, preferably a gel, may be applied. This sealing means is used as a passivation measure in order to protect the measuring bridge of the pressure measuring cell from contamination and corrosion. A gel that is elastic and does not affect the sensitivity of the measuring diaphragm of the pressure measuring cell is particularly well suited for this purpose.

In an advantageous further development, guide means which support an exact positioning of a printed circuit board on the circuit carrier are provided. Appropriate segments on the circuit carrier that engage in the associated recesses or openings in the printed circuit board are well suited in particular for this purpose. Mainly, this simples the installation of very small components. A fixing adhesive may be applied to the top side of these guide means, which are designed, e.g., as a segment, to permanently attach the printed circuit board to the circuit carrier. The conductive adhesive domes are located next to the centering segment, via which the printed circuit board is contacted in an electrically conductive manner to the pressure measuring cell and/or the connection contact points. The conductive adhesive domes and the underside of the printed circuit board are therefore separated by a defined distance.

In an advantageous further development, the circuit carrier preferably includes three-dimensional, external current carrying traces. Via these current carrying traces, the through-contacting between the pressure measuring cell to the printed circuit board and from the printed circuit board to the connection contacts is established. This dual function of the circuit carrier, i.e., to accommodate the printed circuit board, and to contain current carrying traces, further facilitates the miniaturization of the connection unit for a pressure measuring cell. The circuit carrier is preferably manufactured using MID-2K technology, i.e., the injection-molded circuit carrier ("molded interconnect device") is composed of two components, e.g., a galvanizable plastic that is partially enclosed in a coating of a second, non-galvanizable plastic applied via injection molding. The partially projecting surfaces of the preliminary injection-molded article are coated with a metallic surface using a galvanic process, thereby producing the external current carrying traces. The use of an injection-molded circuit carrier is particularly well-suited for use in the present application since it facilitates the miniaturization of the connection unit for the pressure measuring cell, thanks to the improved freedom in terms of shape, and thanks to the integration of electrical and mechanical functions.

Alternatively, this circuit carrier may also be manufactured using laser direct structuring MID. In this case, the circuit carrier is composed of an injection-molded part, in which the locations of the current carrying traces are structured using a laser, which are then coated with a metallic surface using a galvanic process, thereby producing the external current carrying traces.

According to an advantageous further development, bonded contact means, preferably contact rivets, which are used as contact surfaces for a separable electrical connection are attached using conductive adhesive. This simplifies the manufacture, and makes it possible to create a detachable connection of the pressure sensor and the built-on control device.

In an advantageous further development, a preferably metallic protective sleeve is provided, which, as mechanical protection, prevents the pressure measuring cell from being bent, in particular when it is replaced, and it diverts overvoltages (e.g., ESD pulses) to the fastening flange. This increases the robustness of the system both mechanically and electrically, to equal extents.

Further advantageous refinements result from the further dependent claims and the description.

An embodiment of the connection unit for a pressure measuring cell is depicted in the drawing and is described in greater detail below.

DESCRIPTION OF THE PREFERRED EMBODIMENTS

Figure 1:
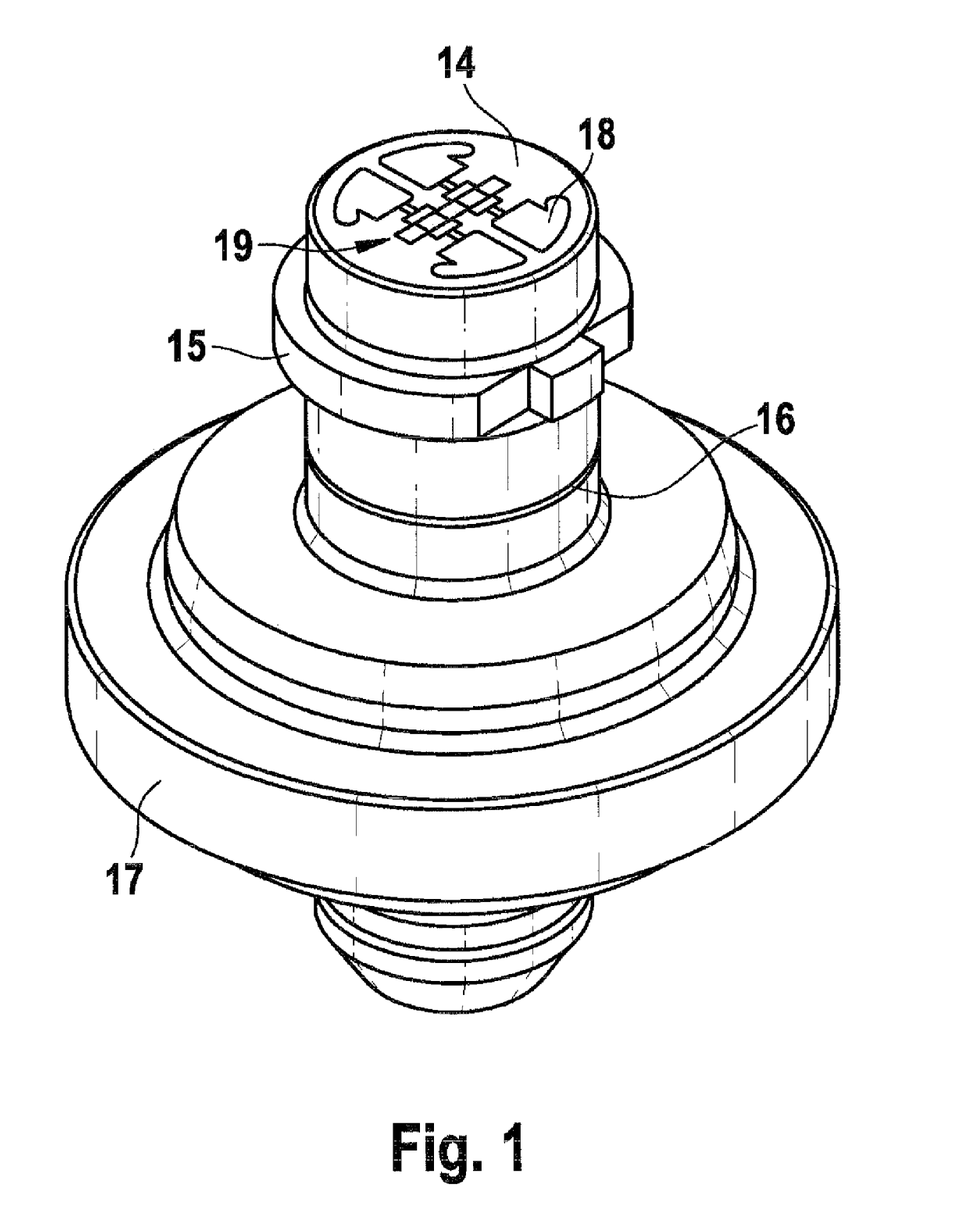
FIG. 1 shows a fastening flange with a welded-on pressure measuring cell.

The hydraulic pressure of a solenoid-valve controlled fluid in a brake system is converted to an electrical signal via a pressure measuring cell 14. To this end, pressure measuring cell 14 is placed on a fastening flange 17 in such a manner that a diaphragm of pressure measuring cell 14 is deformed depending on the pressure of the fluid. The deformation of the diaphragm is detected by a measuring bridge 19. Pressure measuring cell 14 is composed of a carrier 15 which is substantially tubular in design. Furthermore, carrier 15 includes a flange in its middle section, which is primarily annular in design. To connect additional components in correct positions, at least one section of the flange of carrier 15 includes a preferably rectangular projection. On the side of pressure measuring cell 14 far from the pole core when in the installed state, four electrical contact points 18 are provided on measuring bridge 19, via which it is possible to tap the output signals from measuring bridge 19. Carrier 15 of pressure measuring cell 14 is designed such that its inner side interacts in a form-fit manner with the top side of the pole core and with fastening flange 17. Carrier 15 is placed on fastening flange 17 and is connected thereto in a pressure-tight manner via welding, preferably laser welding 16.

A circuit carrier 20 is placed on pressure measuring cell 14. Circuit carrier 20 is substantially cylindrical in design and has a rectangular middle section for receiving printed circuit board 32. The inner contour of the lower section of circuit carrier 20—as indicated above with reference to FIG. 2—is designed to be mechanically connected to the outer contour of pressure measuring cell 14, and it encloses it at least partially. For this purpose, circuit carrier 20 includes a shoulder in the lower region of the cylindrical contour, which is situated on the flange of carrier 15 when in the installed state. Four domes 31 are provided for the purpose of establishing electrical contact between contact points 18 of pressure measuring cell 14 and current carrying traces 47 of circuit carrier 20; conductive adhesive is applied to the top side of domes 31 for establishing electrical contact between pressure measuring cell 14 and circuit carrier 20 and mechanically fastening them in position. The lower cylindrical region of circuit carrier 20 is closed by two diametrically opposed centering segments 37 which overhang in the axial direction opposite to pressure measuring cell 14. In addition, an opening 60 is formed in the lower region of the lower cylindrical section of circuit carrier 20, into which a sealing means 59, e.g., a gel, may be applied, in order to protect measuring bridge 19 located underneath it against environmental influences. In the upward direction, the cylindrical region of circuit carrier 20 transitions into a rectangular region, on one side of which a central segment 41 is provided in the middle section in the axial direction, on the external side of which a fixing adhesive 43 may be applied for attaching printed circuit board 32 to circuit carrier 20. In addition, eight conductive adhesive domes 45 are provided on the side of the rectangular region of circuit carrier 20 on which printed circuit board 32 is accommodated. Domes 45 project slightly outwardly relative to the rectangular body of circuit carrier 20. They are coated with conductive adhesive to establish electrical contact between printed circuit board 32 and current carrying traces 47.

Figure 2:
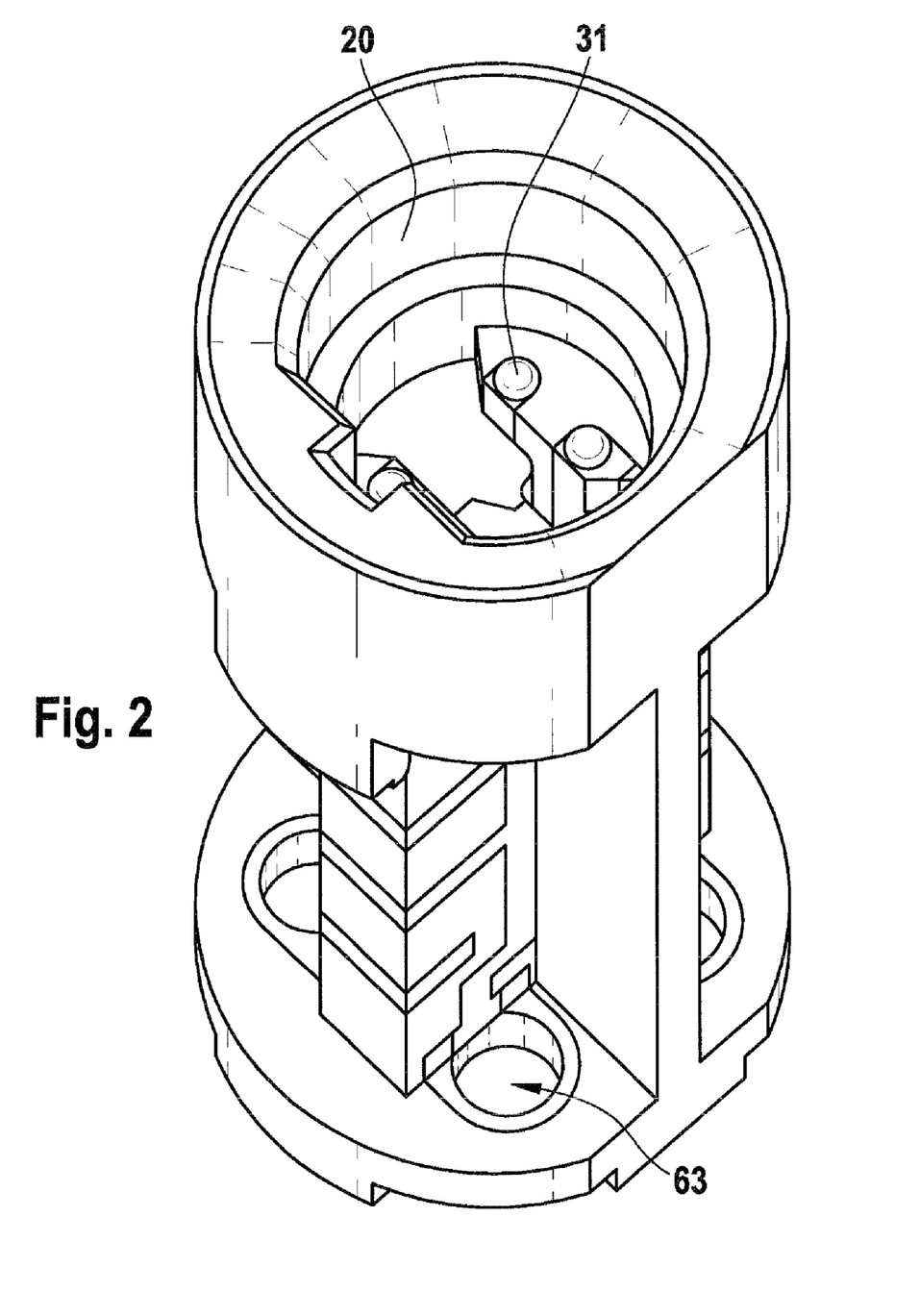
FIG. 2 shows a circuit carrier in a view from below.

Circuit carrier 20 becomes cylindrical in shape toward the top. Four openings 63 are provided, which are used to receive contact means 51, which are designed in the form of rivets. Openings 63 are provided with conductive adhesive surfaces 49 in order to establish contact between contact means 51 and particular current carrying traces 47 using conductive adhesive. A central centering segment 38 is provided on the top, cylindrical region of circuit carrier 20, as an extension of central segment 41; central centering segment 38 interacts with a central centering aid 36, i.e., a preferably U-shaped recess in printed circuit board 32.

Figure 3:
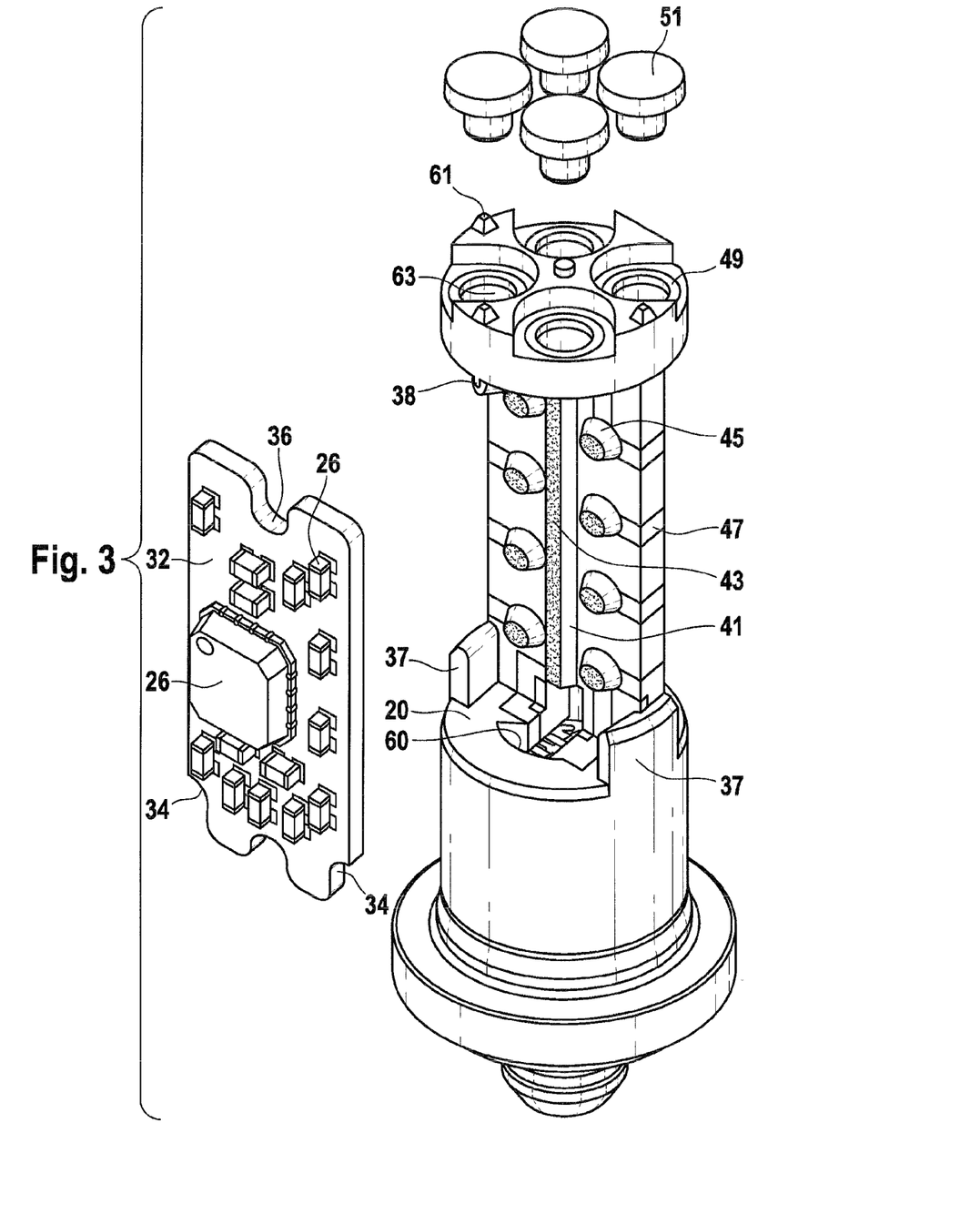
FIG. 3 shows a printed circuit board with the components installed, before it is bonded to the circuit carrier.

FIG. 3 shows printed circuit board 32 with components installed, on which electronic components 26, such as an integrated circuit, resistors, capacitors, etc., are located. In the lower region, printed circuit board 32 includes lateral recesses 34 which interact with external centering segments 37 of circuit carrier 20. A recess which is used for centering purposes is also provided in the lower, middle region of printed circuit board 32.

Figure 4:
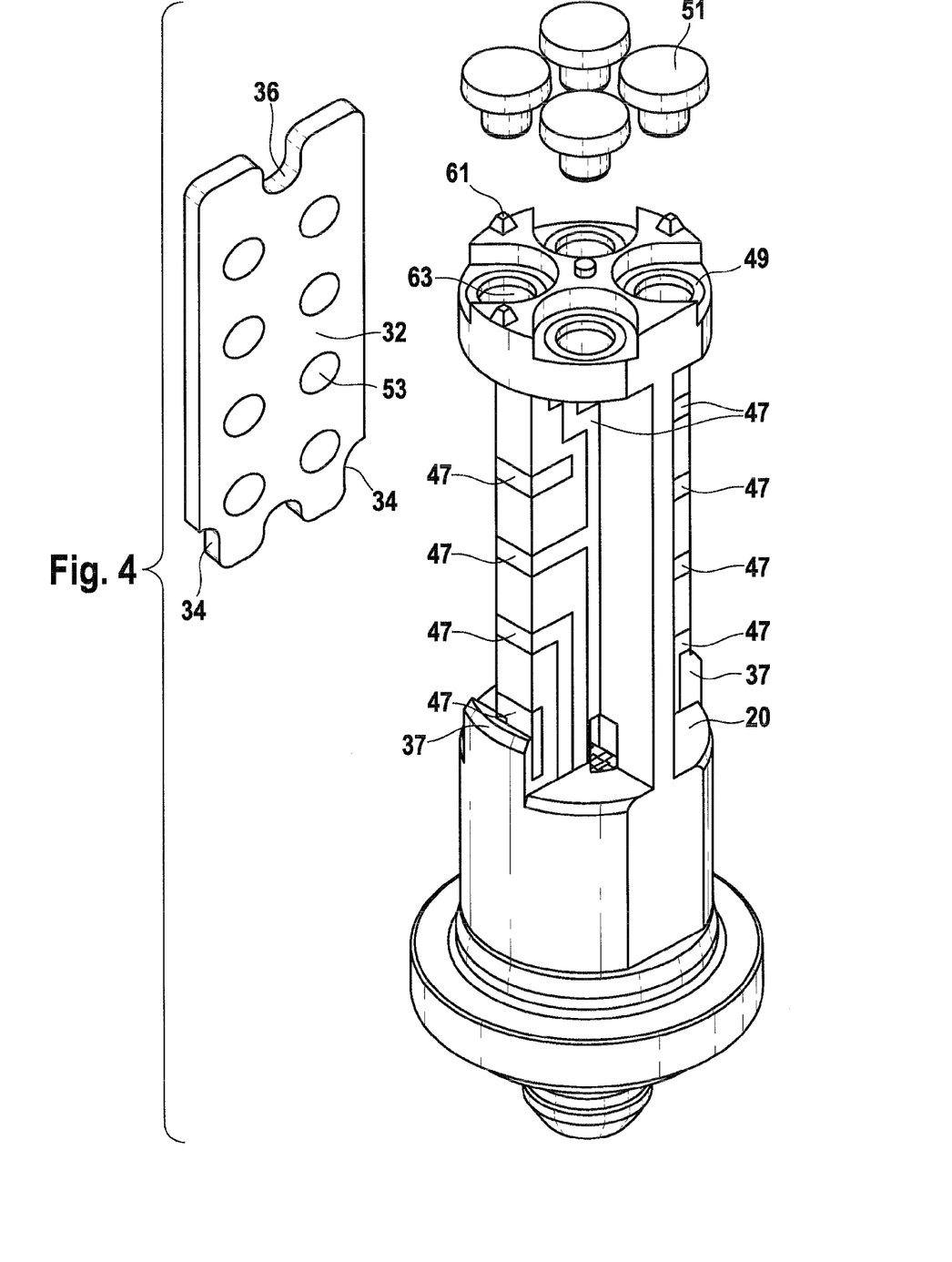
FIG. 4 shows the back side of the printed circuit board with the associated circuit carrier, in another view.

FIG. 4 shows the back side of printed circuit board 32. Eight conductive adhesive surfaces 53 are provided, via which four incoming signals from pressure measuring cell 14 are guided, as are the four outgoing signals that are forwarded to contact means 51. Current carrying traces 47, which are external in design, are shown in this view, in the rectangular region of circuit carrier 20. Via current carrying traces 47, conductive adhesive surfaces 53 of printed circuit board 32 are connected to contact points 18 of measuring bridge 19, and the four other conductive adhesive surfaces 53 are connected above them to four contact means 51 and their conductive adhesive surfaces 49 in an electrically conductive manner.

Figure 5:
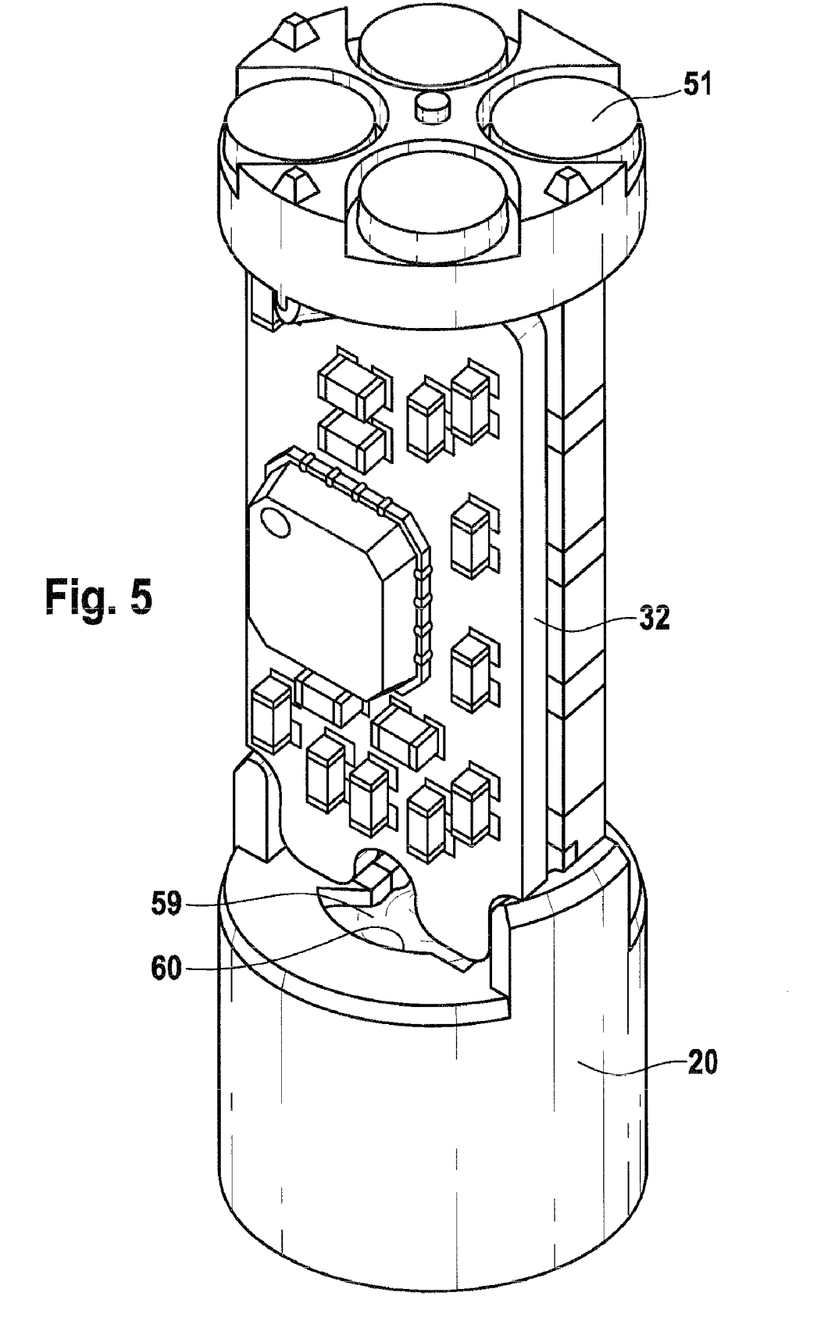
FIG. 5 shows the circuit carrier with the printed circuit board bonded to it.

FIG. 5 shows printed circuit board 32 in the installed state. FIG. 5 also shows opening 60 which is used to receive sealing means 59, e.g., a gel. Contact means 51 are also inserted into appropriate openings 63 in circuit carrier 20.

Figure 6:
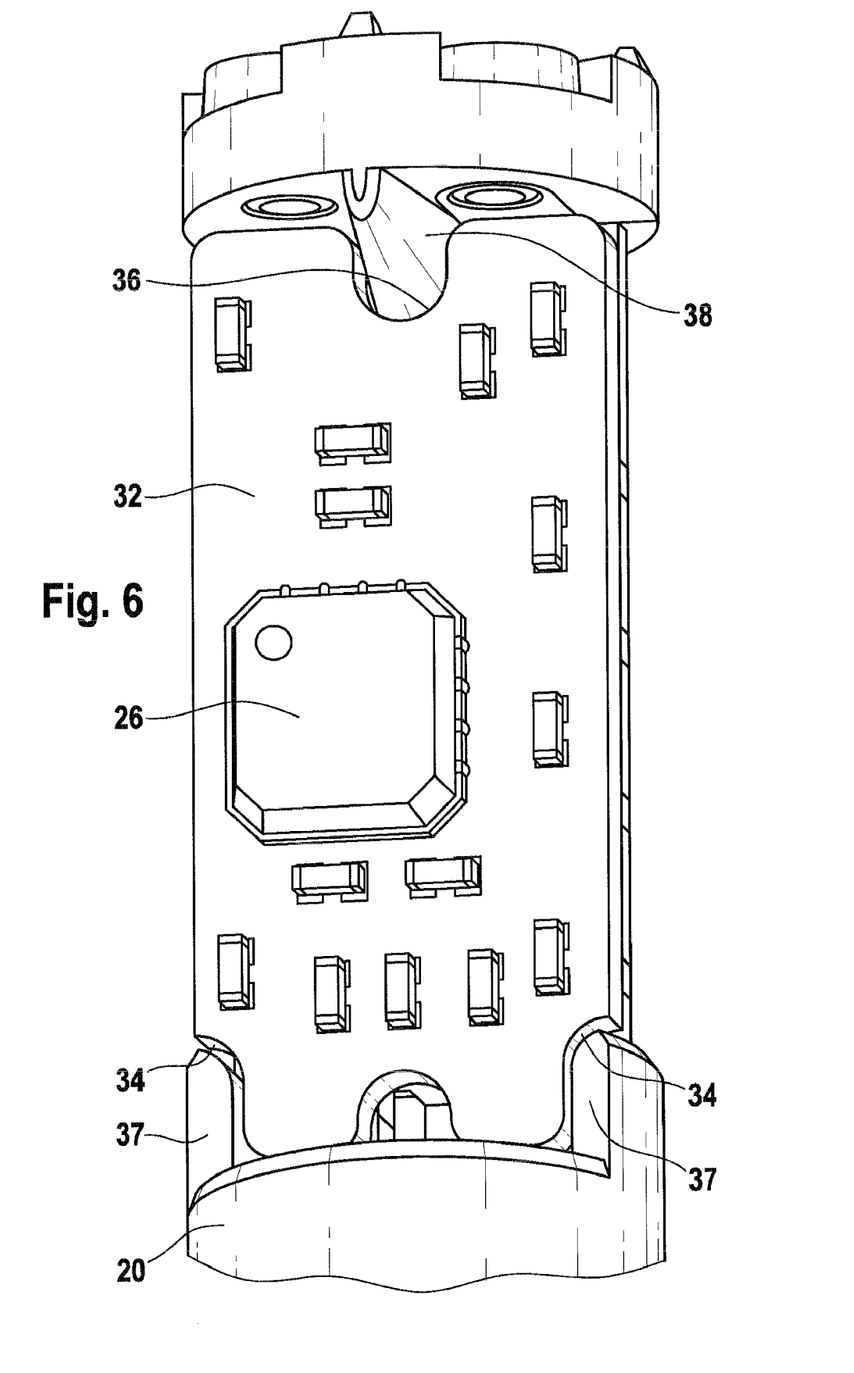
FIG. 6 shows the centering segment for fixing the printed circuit board in position on the circuit carrier.

FIG. 6 shows more clearly how middle centering segment 38 interacts with middle centering aid 36 of printed circuit board 32, and how outer centering segments 37 interact with external centering aids 34 on printed circuit board 32. FIG. 6 also shows that middle centering segment 38 increases in terms of its outer circumference in the direction toward the rectangular section of circuit carrier 20, thereby making it easy to insert printed circuit board 32. At the end stop, the exact position of printed circuit board 32 relative to circuit carrier 20 is reached.

Figure 7:
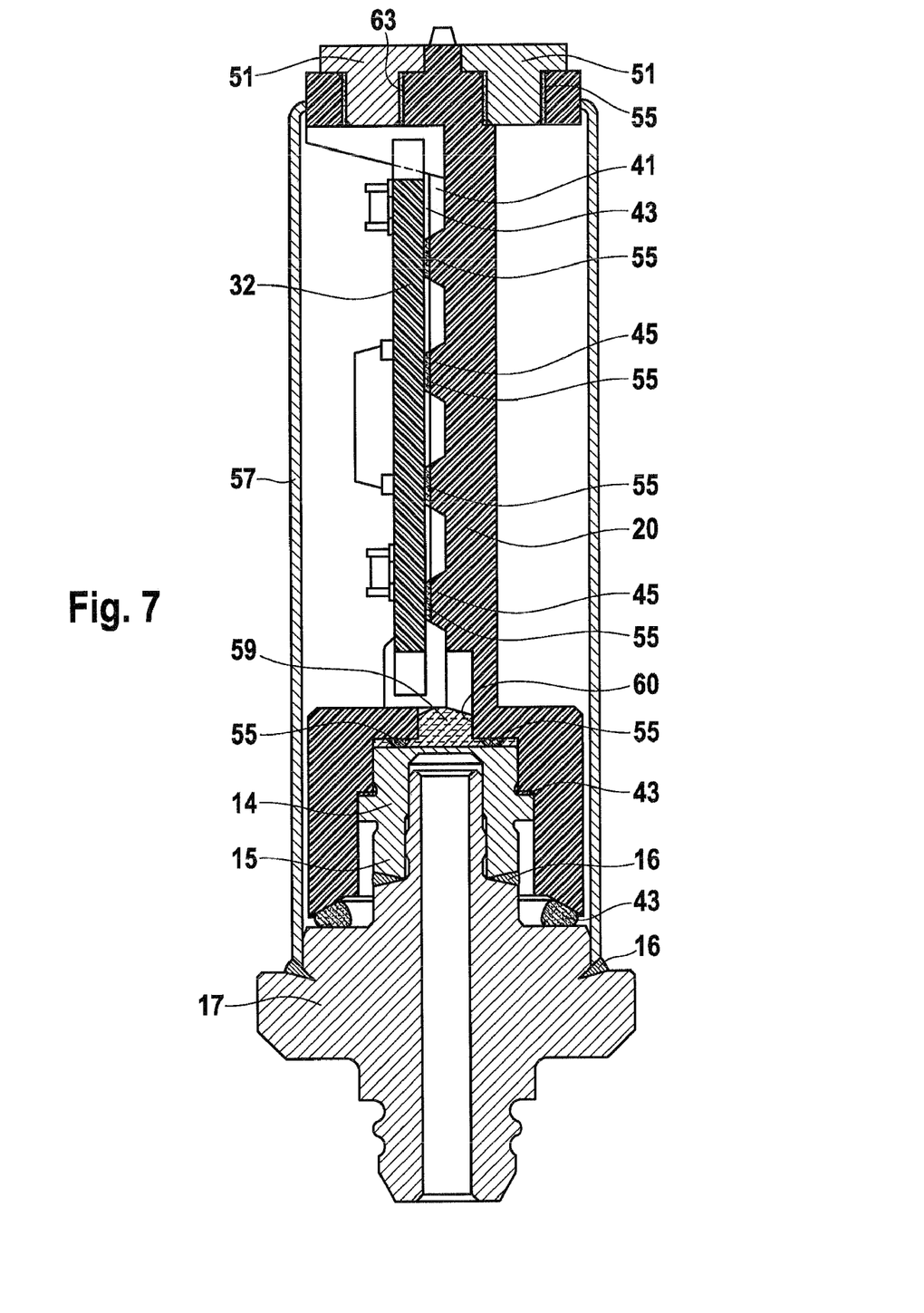
FIG. 7 shows a cross section through the connection unit, with the protective sleeve in place.

FIG. 7 shows the components in the installed state. In this state, circuit carrier 20 is mechanically and fixedly connected to fastening flange 17 via a fixing adhesive 43. Pressure measuring cell 14 encloses fastening flange 17 toward the top, and it is located on a shoulder thereof in such a manner that the fluid pressure directed through a bore is converted into appropriate output signals of measuring bridge 19 via the diaphragm (not depicted) of the pressure measuring cells. Circuit carrier 20 encloses pressure measuring cell 14 at least partially from the top. Opening 60 is located in circuit carrier 20, pointing upwardly, and it closes the cylindrical lower region of circuit carrier 20. A sealing means 59 is inserted into opening 60. Furthermore, contact points 18 of measuring bridge 19 are each contacted in an electrically conductive manner via conductive adhesive 55 to an external current carrying trace 47 of circuit carrier 20. Printed circuit board 32 is connected via fixing adhesive 43 to middle segment 41 of circuit carrier 20. The electrical contacting of printed circuit board 32 to current carrying traces 47 takes place via conductive adhesive 55 that is applied to the top sides of domes 45. Four openings 63 are provided in the upper cylindrical region of circuit carrier 20 for receiving rivet-shaped contact means 51. Contact means 51 are connected to circuit carrier 20 via conductive adhesive 55. A current carrying trace 47 is directed to each of the four contact means 51, and the electrically conductive contact is established via conductive adhesive surfaces 49 using conductive adhesive 55. Furthermore, a protective sleeve 57 is provided; protective sleeve 57 encloses circuit carrier 20 with printed circuit board 32 on which components have been installed. Protective sleeve 57 is connected via laser welding 16 to fastening flange 17. Contact means 51 are still accessible, however. Installation aids 61 extend in the axial direction on the top side of circuit carrier 20. Installation aids 61 make it easier to slide protective sleeve 57 over circuit carrier 20 via a guide that is beveled appropriately.

The connection unit for a pressure measuring cell 14 depicted in the figures functions as described below. The hydraulic pressure in a brake system is converted to an electrical signal via pressure measuring cell 14, which is installed, e.g., on the solenoid valve. The electrical signal is prepared by an integrated circuit as an example of an electronic component 26, and it is amplified and forwarded to a control device. Pressure measuring cell 14 includes a diaphragm that detects the pressure of the fluid. A fluid-filled channel located in the interior of fastening flange 17 is formed in the interior of the pole core of the valve. This channel is closed in a pressure-tight manner via the diaphragm. The pressure conditions of the diaphragm are converted into appropriate electrical signals by measuring bridge 19. Fastening flange 17 is permanently mounted in the hydraulic block using a self-clinch method.

Circuit carrier 20 is preferably designed using MID-2K technology. It is manufactured as a plastic injection-molded circuit carrier 20 using MID (molded interconnect device) technology, in particular using two-shot molding. Using MID technology, it is possible to realize three-dimensional circuit structures. A preliminary injection-molded article composed of a galvanizable plastic is partially covered with a second, non-galvanizable plastic via injection molding. The partially projecting surfaces of the preliminary injection-molded article are coated with a metallic surface using a galvanic process, thereby producing three-dimensional, external current carrying traces 47. Circuit carrier 20 is characterized by a great deal of freedom in terms of shape, in particular via the integration of electrical and mechanical functions. As a result, the connection unit for pressure measuring cell 14 may be particularly compact in design.

Three-dimensional, external current carrying traces 47 are now used to establish contact between contact points 18 of measuring bridge 19 and printed circuit board 32. The electrical contact between particular current carrying traces 47 and contact points 18 is established using a conductive adhesive 55, as indicated in FIG. 7. Particular current carrying traces 47 are contacted in an electrically conductive manner to conductive adhesive surfaces 53 on the back side of printed circuit board 32 via conductive adhesive domes 45. In the same manner, the output signals from the integrated circuit are guided from printed circuit board 32 to contact means 51. In turn, the output signals are contacted to conductive adhesive domes 45 using conductive adhesive 55 via corresponding conductive adhesive surfaces 53. External current carrying trace 47 which is electrically contacted to particular dome 45 is directed on the middle section in the direction toward the particular openings in upper, cylindrical region of circuit carrier 20. In turn, the outsides of openings 63 are designed as conductive adhesive surfaces 49, in order to ensure that electrical contacting exists between particular current carrying traces 47 and contact means 51. In turn, the electrical contacting between contact means 51 and conductive adhesive surfaces 49 is established via conductive adhesive 55. Contact means 51, which are designed as contact rivets, are the contact surfaces for a separable electrical connection. The counterpart, which is not shown, is composed, e.g., of four contact springs or spring pins which are anchored in the electrical control device.

Welded-on protective sleeve 57 is composed of metal and is used to prevent pressure measuring cell 14 from being bent; it may also divert overvoltages, e.g., ESD pulses, to fastening flange 17. Three pyramid-shaped installation aids 61 are used as installation-centering tools to ensure that protective sleeve 57 is joined well.

The above-described connection unit for a pressure measuring cell 14 is suited for use in particular in brake systems in motor vehicles, although it is not limited thereto. A large number of pressure sensors is used where installation space is limited, in premium-class brake systems in particular. A pressure sensor that requires a minimum of installation space is therefore well suited for use for this application.

What is claimed is:

1. A connection unit for a pressure measuring cell, comprising at least one pressure measuring cell (40) which detects, in particular, a pressure of a hydraulic block; the pressure measuring cell (40) includes at least one connection point (18) via which at least one electrical output signal from the pressure measuring cell (14) is tapped, having at least one circuit carrier (20) on which at least one electronic component (26) and/or a printed circuit board (32) with an electronic component (26) is located; the circuit carrier (20) includes at least one external current carrying trace (47) for establishing contact between the connection point (14) and the electronic component (26); at least one means for contacting (51) is provided, via which an output signal from the electronic component (26) is tapped; the electronic component (26) is connected to the means for contacting (51) via at least one external current carrying trace (47) of the circuit carrier (20).

2. The device as recited in claim 1, wherein the circuit carrier (20) includes at least one conductive adhesive dome (45) for establishing electrical contact between the current carrying trace (47) and at least one conductive adhesive surface (53) of the printed circuit board (32).

3. The device as recited in claim 1, wherein the circuit carrier (20) includes at least one opening (63) for receiving the means for contacting (51).

4. The device as recited in claim 1, wherein the opening (63) is at least partially enclosed by a conductive adhesive surface (49) for establishing contact between the means for contacting (51) and the current carrying trace (47) using conductive adhesive (55).

5. The device as recited in claim 1, wherein the circuit carrier (20) includes at least one centering segment (37, 38) which interacts with the printed circuit board (32) for centering purposes.

6. The device as recited in claim 1, wherein the circuit carrier (20) includes at least one opening (60) for receiving a sealing means (59), in particular a gel.

7. The device as recited in claim 1, wherein the circuit carrier (20) is composed, at the least, of a preliminary injection-molded article composed of a galvanizable plastic, and a second, non-galvanizable plastic; the current carrying traces (47) are formed using a galvanic process with metallic surface coating.

8. The device as recited in claim 1, wherein the circuit carrier (20) includes at least one central segment (41) onto which a fixing adhesive (43) is applied for attaching the printed circuit board (32).

9. The device as recited in claim 1, wherein a protective sleeve (57) which at least partially encloses the circuit carrier (20) is provided.

10. The device as recited in claim 1, wherein at least one installation aid (61) for guiding the protective sleeve (57) is provided.

* * * * *